UNITED STATES PATENT OFFICE.

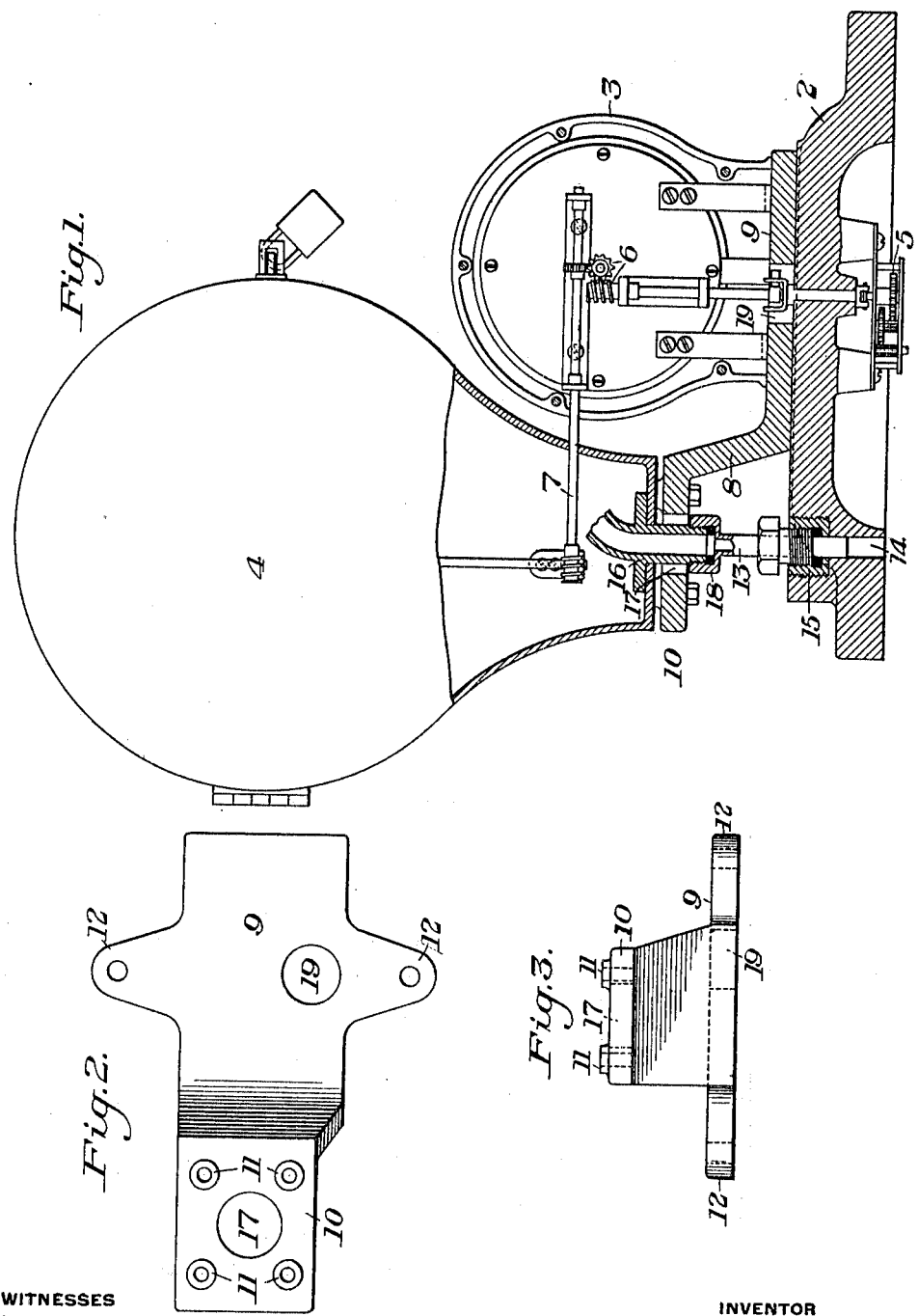

THOMAS B. WYLIE, OF PITTSBURGH, PENNSYLVANIA.

VOLUME AND PRESSURE REGISTER FOR FLUIDS.

1,105,740.    Specification of Letters Patent.    Patented Aug. 4, 1914.

Application filed April 2, 1913. Serial No. 758,384.

*To all whom it may concern:*

Be it known that I, THOMAS B. WYLIE, a citizen of the United States, and resident of Pittsburgh, Allegheny county, Pennsylvania, have invented a new and useful Improvement in Volume and Pressure Registers for Fluids, of which the following is a full, clear, and exact description, reference being had to the accompanying drawings, forming part of this specification, in which:—

Figure 1 is a view of a rear elevation partly in vertical section of a register embodying my invention; Fig. 2 is a plan view with the bracket detached; and Fig. 3 is an end view of the same.

My invention has relation to volume and pressure registers for fluids, and is an improvement upon the register described and claimed in my Patent No. 796,620 of August 8th, 1905. The instrument described in said patent comprises an ordinary meter for registering the volume of flow of a fluid, and mounted on the same casing with the meter dial is a combined volume and pressure register. The latter is provided with a rotary dial, which is driven by a cross-shaft geared to the actuating gearing of the meter dials. In practice, it frequently becomes necessary to remove either the meter dial instrument or the combined volume and pressure register for the purpose of testing or repairs, or to substitute a new instrument. In doing this considerable time is required in order to properly aline the two instruments so that the cross-shaft will properly gear with both of them.

The object of my present invention is to provide novel means for supporting the two instruments on the meter casing of such a character that the mere placing of either instrument on its support will insure the proper alinement of the gears. To this end, instead of supporting both instruments directly on the cover of the meter casing, I provide a bracket member secured to said cover and having a support at each end portion for one of the instruments. The supporting surfaces of this bracket being always in a definite relation to each other, the mere placing of either instrument thereon insures the proper alinement of the gears.

Referring to the accompanying drawing, in which I have illustrated the invention, the numeral 2 designates the cover of a meter casing, 3 is the casing of the meter dials, and 4 is the casing of the volume and pressure register. The meter dials are driven by suitable gear connections 5 and 6, from the meter proper.

7 designates a cross shaft which drives the dial of the register 4 from the gearing 6.

The parts as thus far described are in all respects similar to the corresponding parts shown in my said patent, to which reference may be had for a more complete description.

The upper surface of the cover 2 is finished to seat a bracket 8 having two supporting portions 9 and 10 in different horizontal planes. The portion 9 seats directly upon the finished surface of the cover, and forms a support for the casing 3; while the part 10 is at a considerable higher level and forms a support for the casing 4. The upper surface of the portion 10 is preferably provided with the seating bosses or projections 11 for the base of the casing 4, these projections being accurately finished on their upper surfaces. The bracket also has the laterally extending lugs 12 having bolt holes for securing it to the cover 2.

13 designates a pressure pipe extending downwardly into the cover and communicating with the interior of the meter casing by port 14. This pipe also extends upwardly within the casing 4 for the purpose of actuating the usual pointer, not shown. The cover is provided with a stuffing box 15 for this pipe. The pipe is made in two sections, united by a union 16. The upper section of the pipe is preferably formed with a flange 17 seating upon the inner surface of the bottom of the casing 4. The bracket is also formed with an opening 19 through the portion 9, for the vertical shaft of the gear 6.

The bracket is designed to be permanently secured to the cover of the casing. The supporting surfaces of the two parts 9 and 10 are in fixed relation to each other, and consequently when the instruments are placed thereon, a proper alining of the gearing is insured. Therefore, either instrument may be removed and replaced without the necessity for the use of liners or other adjusting means to bring the gearing into proper relation.

What I claim is:—

1. Apparatus of the character described, comprising a meter casing having a plurality of instrument supporting surfaces thereon, there being a third surface on said casing, means for securing said instruments to said first mentioned surfaces, and an adjustable disconnectible pipe connection between one of said first mentioned surfaces and said third surface; substantially as described.

2. Apparatus of the character described, comprising a meter casing, a supporting member secured to the top of the meter casing, and having two meter supporting surfaces in different horizontal planes, a meter dial casing detachably secured to one of said supporting surfaces, a volume and pressure registering instrument detachably secured on the other supporting portion, a third surface on said meter casing, and an adjustable disconnectible pipe connection between the third surface and the volume and pressure registering instrument; substantially as described.

3. Apparatus of the character described, comprising a meter casing, a supporting member secured to the top of the meter casing, and having two supporting portions in different horizontal planes, said supporting member having an upwardly and outwardly extending arm, one of said surfaces being on the upper face of said arm, intergeared indicating instruments removably mounted on said surfaces, a third surface on the meter casing below the upwardly and outwardly extending arm of the supporting member, and an adjustable disconnectible pipe connection between the upper surface on said arm and the surface on the meter casing below said arm; substantially as described.

In testimony whereof, I have hereunto set my hand.

THOMAS B. WYLIE.

Witnesses:
G. I. HOLDSHIP,
JAS. H. STOUGHTON.